United States Patent [19]

Kercheck

[11] Patent Number: 5,165,177
[45] Date of Patent: Nov. 24, 1992

[54] SAI AND CASTER COMPENSATION FOR LIVE CASTER AND LIVE CAMBER READINGS

[75] Inventor: Gary Kercheck, Colgate, Wis.

[73] Assignee: Bear Automotive Service Equipment Company, New Berlin, Wis.

[21] Appl. No.: 761,064

[22] Filed: Sep. 17, 1991

[51] Int. Cl.[5] .................. G01B 11/275; G01B 5/255; G06F 15/20
[52] U.S. Cl. .............................. 33/203.18; 364/559; 364/424.03
[58] Field of Search ........................ 33/203.12, 203.21; 364/559, 424.03; 356/155

[56] References Cited

U.S. PATENT DOCUMENTS

| | | | |
|---|---|---|---|
| 3,901,604 | 8/1975 | Butler | 356/155 |
| 4,381,548 | 4/1983 | Grossman et al. | 364/559 |
| 4,394,798 | 7/1983 | Beissbarth | 33/203.18 |
| 4,500,201 | 2/1985 | Lill | 33/203.18 |
| 4,594,789 | 6/1986 | Marino et al. | 33/203.18 |
| 4,761,749 | 8/1988 | Titsworth et al. | 364/559 |
| 4,898,464 | 2/1990 | Thorne et al. | 33/203.18 |
| 5,014,227 | 5/1991 | Kling et al. | 364/559 |
| 5,105,547 | 4/1992 | Fujii | 356/155 |

Primary Examiner—William A. Cuchlinski, Jr.
Assistant Examiner—C. W. Fulton
Attorney, Agent, or Firm—Kinney & Lange, P.A.

[57] ABSTRACT

Measurement devices are mounted on left and right steerable wheels of a vehicle. Caster is calculated for each of the wheels based upon measurements made with the measurement devices. Pitch at zero toe is determined for the left and right wheels and a steering axis inclination (SAI) compensation term is determined. Live caster is calculated using the live pitch of the wheel, the caster calculated for the wheel, the pitch at zero toe for the wheel and the SAI compensation term. An output representative of the live caster is provided.

10 Claims, 7 Drawing Sheets

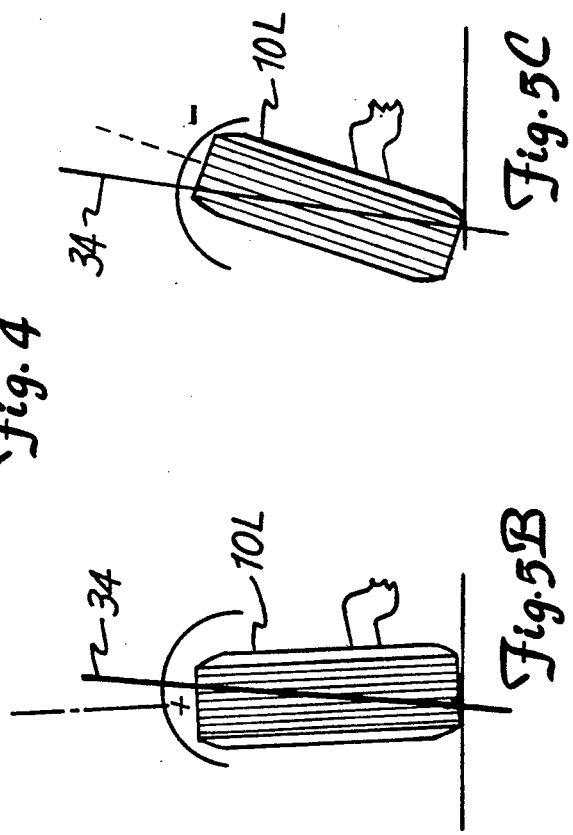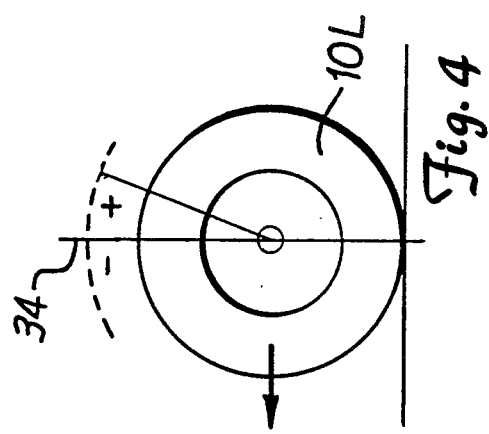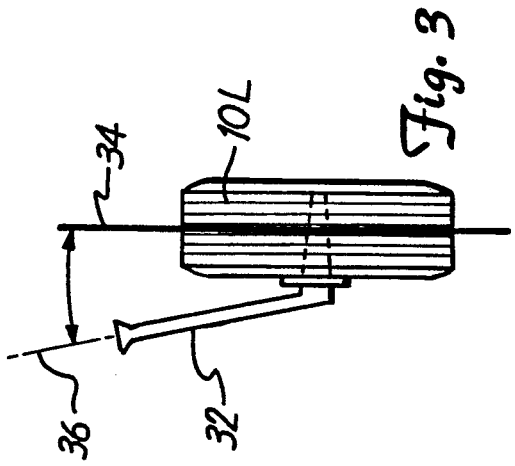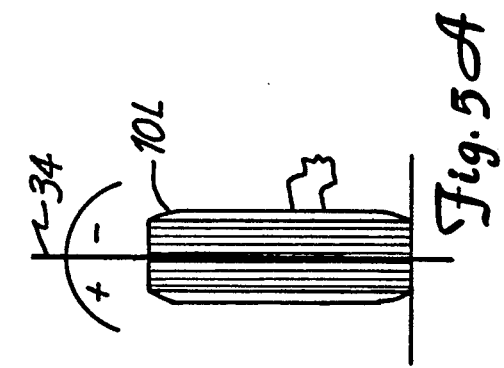

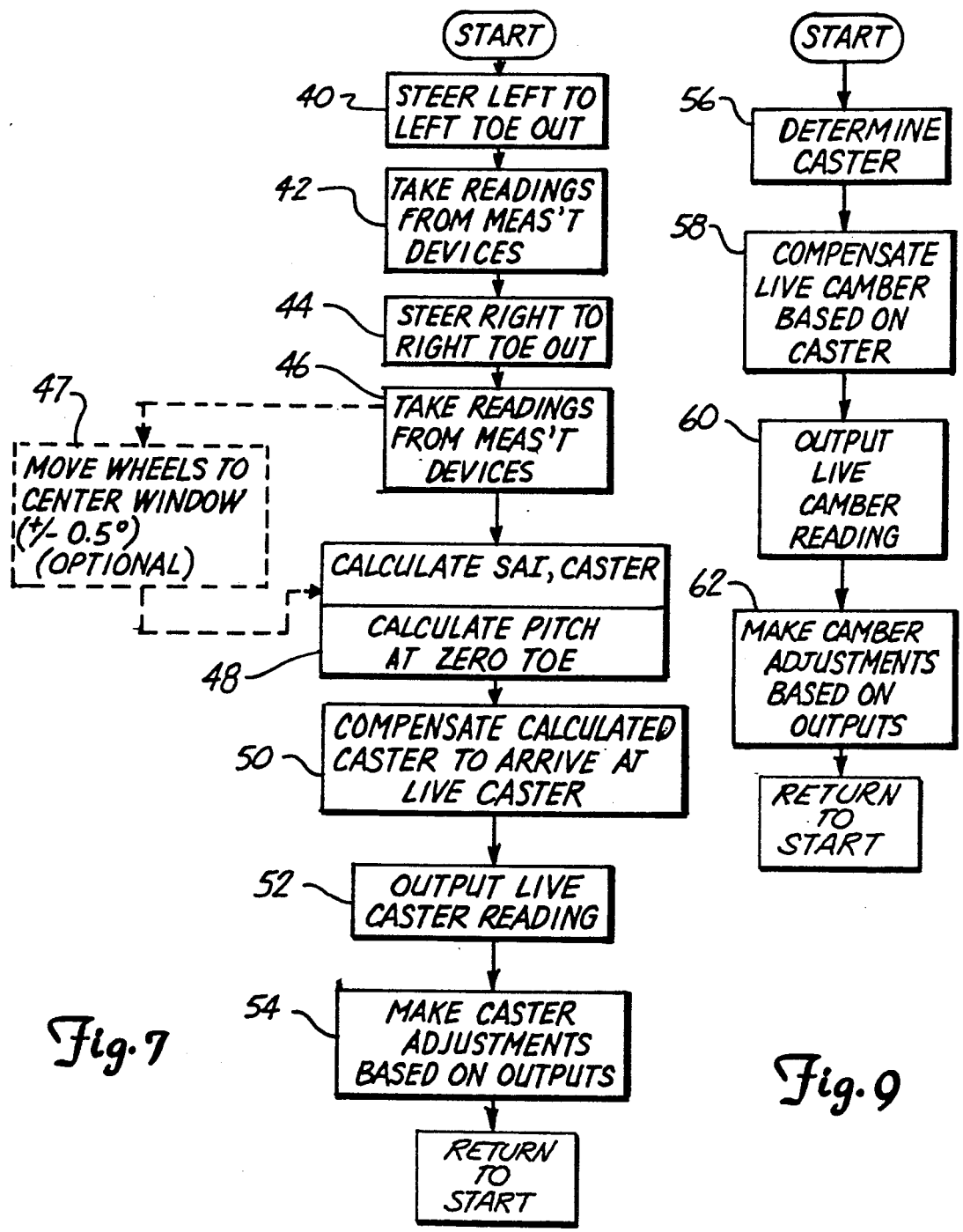

SAI AND CASTER COMPENSATION FOR LIVE CASTER AND LIVE CAMBER READINGS

INCORPORATION BY REFERENCE

The following patent is hereby incorporated by reference: Kling, et al. U.S. Pat. No. 5,014,227, issued May 7, 1991 and assigned to the same assignee as the present patent application.

BACKGROUND OF THE INVENTION

The present invention relates to a wheel alignment technique. In particular, the present invention relates to an improved technique for measuring caster and camber during wheel alignment.

It is important that wheels of an automotive vehicle are properly aligned in order for the wheels of the vehicle to wear properly and in order for the vehicle to handle properly. In addition, proper alignment of the wheels decreases fuel consumption and increases vehicle safety. The wheel alignment parameters which are typically measured and adjusted in order to achieve proper alignment are camber, caster, steering axis inclination (SAI), pitch and toe.

A camber angle is the inclination of the wheel plane with respect to vertical. It is considered positive when the wheel leans outward at the top and it is considered negative when the wheel leans inward. Any wheel of an automobile can have camber.

A caster angle is the angle in side elevation between the steering axis of a steerable wheel (typically one of the front wheels) with respect to vertical. The caster angle is considered positive when the steering axis is inclined rearward (in the upward direction) and negative when the steering axis is inclined forward.

Steering axis inclination (SAI) or king pin inclination is the angle in the front elevation between the steering axis and vertical.

Pitch is an angle which measures rotation of a sensor in the plane of a wheel. Pitch angle is measured relative to ground.

The static toe angle, at a specified wheel load or relative position of the wheel center with respect to the sprung mass, is the angle between the longitudinal axis of the vehicle and the line of intersection of the wheel plane and the road surface. The wheel is said to be "toed-in" if the forward portion of the wheel is turned toward a central longitudinal axis of the vehicle. The wheel is "toed-out" if the forward portion of the wheel is turned away from the central longitudinal axis of the vehicle.

Camber, caster, SAI, and pitch are typically measured using one or more inclinometers which are attached to the wheels. In order to measure camber, the inclinometer measures the angle that the plane of the wheel makes with the vertical. This is similar to the pitch measurement. To measure caster, the wheel is turned through an arc (or a "caster swing" is performed), and the difference between the camber readings is used to derive the caster value. SAI is measured in a manner similar to caster, except that the inclinometer used for the SAI reading measures the change in inclination angle of a line in the plane of the wheel as the wheel is turned through an arc. The SAI measuring inclinometer is aligned at 90 degrees to the inclinometer used for reading camber and caster.

From the above discussion it is seen that caster is not an alignment angle that is directly measurable on most vehicles. Rather, the caster swing is necessary to obtain a measure of a vehicle's caster. The same holds true for SAI. In order to obtain a current, or live, reading for caster, a live caster adjustment meter is provided. To use the meter properly, the operator must make certain that the toe of the wheel being measured is zero degrees plus or minus a small tolerance. Thus, a "toe zero" meter is provided along with the live caster adjustment meter to indicate when the toe of the wheel being measured is within the tolerance allowed.

Previous alignment systems use the following formula for live caster:

$$\text{live caster} = \text{live pitch} - \text{pitch at zero toe} + \text{Calculated Caster} \qquad \text{Eq. 1}$$

In this formula the live pitch is a live reading measured from pitch sensors. Pitch at zero toe and Calculated Caster are constants. The pitch at zero toe is obtained at the end of the caster swing by zeroing the toe on each wheel and then reading the pitch. This is a time consuming step because the toe must be set very precisely. This step is eliminated in the new invention. The Calculated Caster is determined using formulas in Kline et al. U.S. Pat. No. 5,014,227.

Caster affects the camber readings in the same way that SAI affects the pitch readings. On most vehicles, the caster angle is much less than the SAI. Therefore, the effects of caster on camber are less noticeable if the toe of the wheel being measured is non-zero than are the effects of SAI on caster. However, for a more accurate camber reading, it is desirable to substantially minimize the effects of caster on the camber reading. Typically, in order to minimize those effects, the toe of the wheel being measured would be placed at zero plus or minus a very small tolerance.

SUMMARY OF THE INVENTION

The present invention provides new caster and camber measurement techniques so that caster can be compensated for the effects of SAI when the wheel is in a non-zero toe position and so that camber can be compensated for the effects of caster when the wheel is in the non-zero toe position. Such a system eliminates the need for the time consuming process of zeroing the toe of the wheel being measured.

Measurement devices are mounted on left and right steerable wheels. Caster is calculated for each of the wheels based on the measurements made with the measurement devices. Pitch at zero toe is determined for the left and right wheels and a steering axis inclination (SAI) compensation term is also determined. Live caster is calculated for each wheel using the live pitch of the wheel, the caster calculated for the wheel, the pitch at zero toe for the wheel, and the SAI compensation term for the wheel. Outputs are provided which are representative of the live caster calculated for each wheel.

In another embodiment, measurement devices are mounted to the wheels. A caster compensation term is determined for the wheels based on measurements from the measurement devices. Camber is measured for the wheels using the measurement devices, and live camber is calculated for the wheels based on the caster compensation term determined and the measured camber.

BRIEF DESCRIPTION OF THE DRAWINGS

FIG. 3 is a drawing illustrating steering axis inclination (SAI).

FIG. 4 is a drawing illustrating caster.

FIGS. 5A–5C are drawings illustrating positive and negative camber.

FIG. 7 is a flow chart showing caster measurements according to the present invention.

FIG. 9 is a flow chart showing camber measurements according to the present invention.

DETAILED DESCRIPTION OF THE PREFERRED EMBODIMENTS

A. The Wheel Alignment System

Figure 1A:
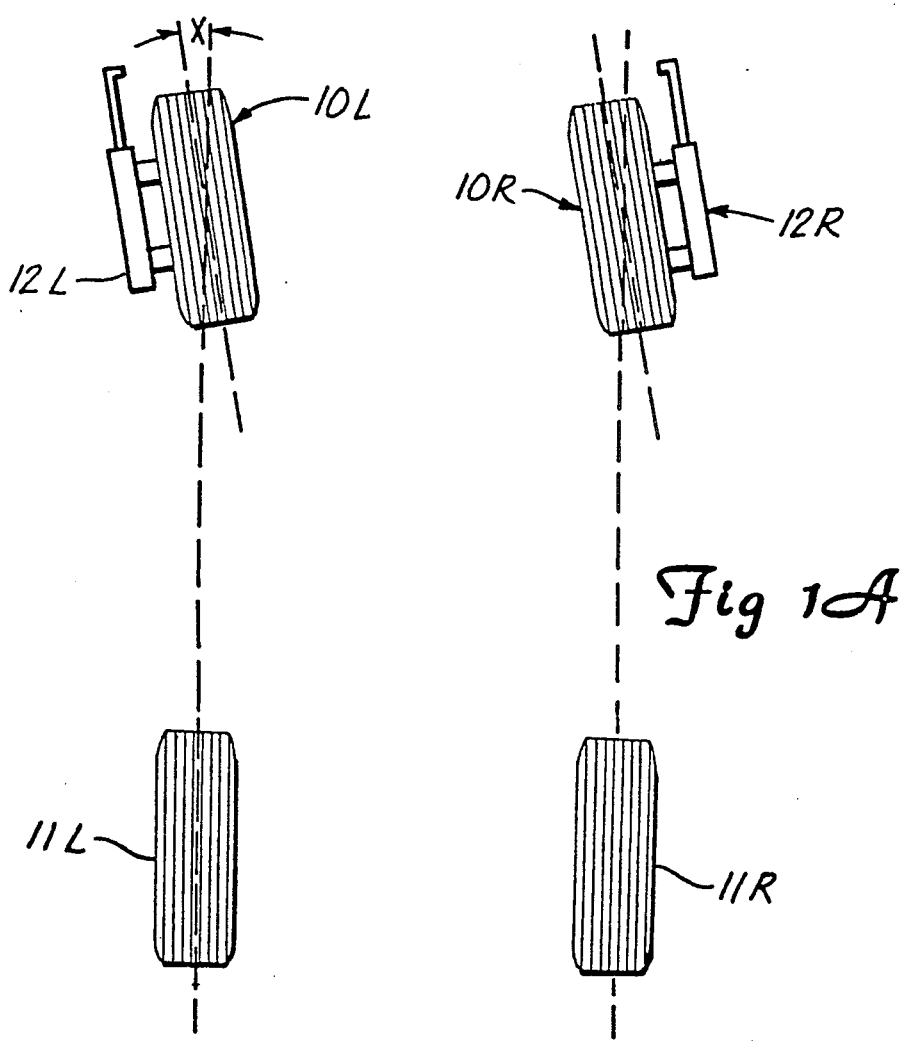
FIGS. 1A and 1B show the front steerable wheels of an automotive vehicle turned to a left toe-out and right toe-out position, respectively.
Figure 1B:
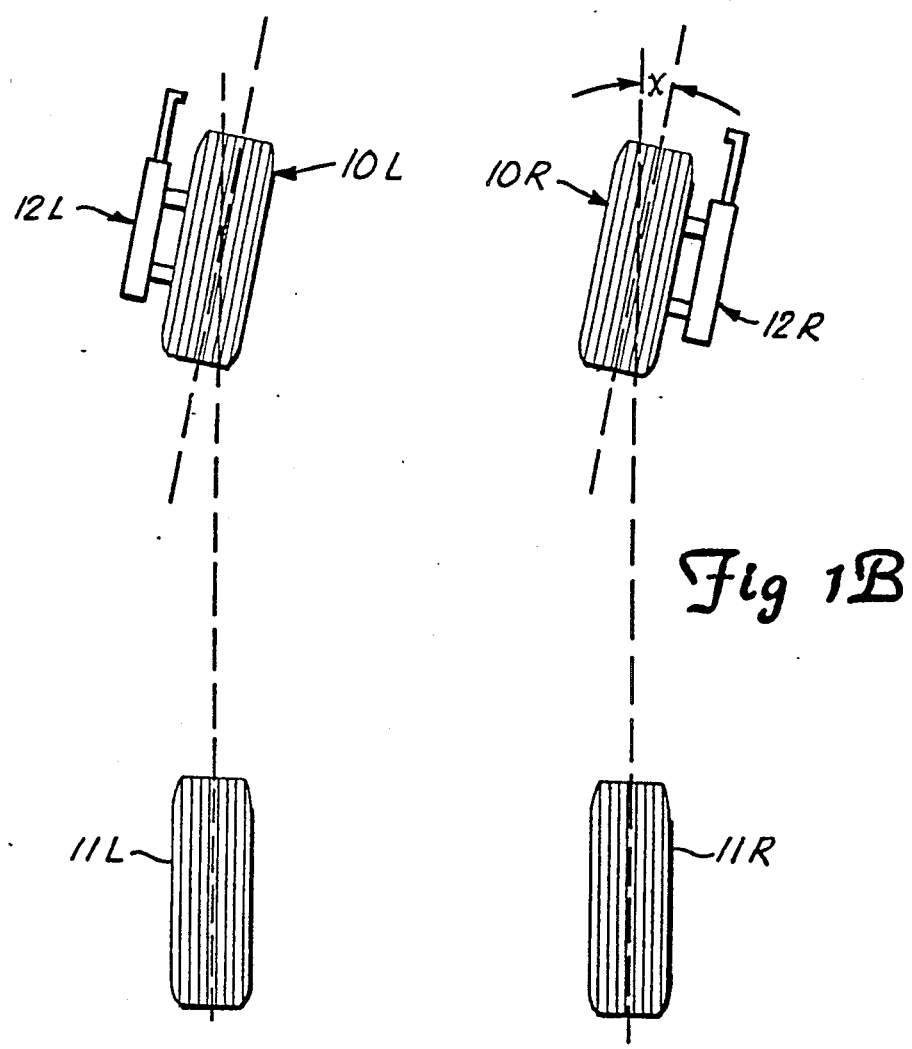

The new caster and camber measurement techniques of the present invention allow live caster and live camber readings and adjustments to be made when the wheel being measured is in a non-zero toe position. FIGS. 1A and 1B show automobile wheels. Front wheels 10L and 10R are left and right steerable wheels for a vehicle while rear wheels 11L and 11R are non-steerable. FIG. 1A shows wheels 10L and 10R in a left turn position and FIG. 1B shows wheels 10L and 10R in a right turn position. Head units 12L and 12R are mounted to the front wheels 10L and 10R, respectively.

Figure 2:
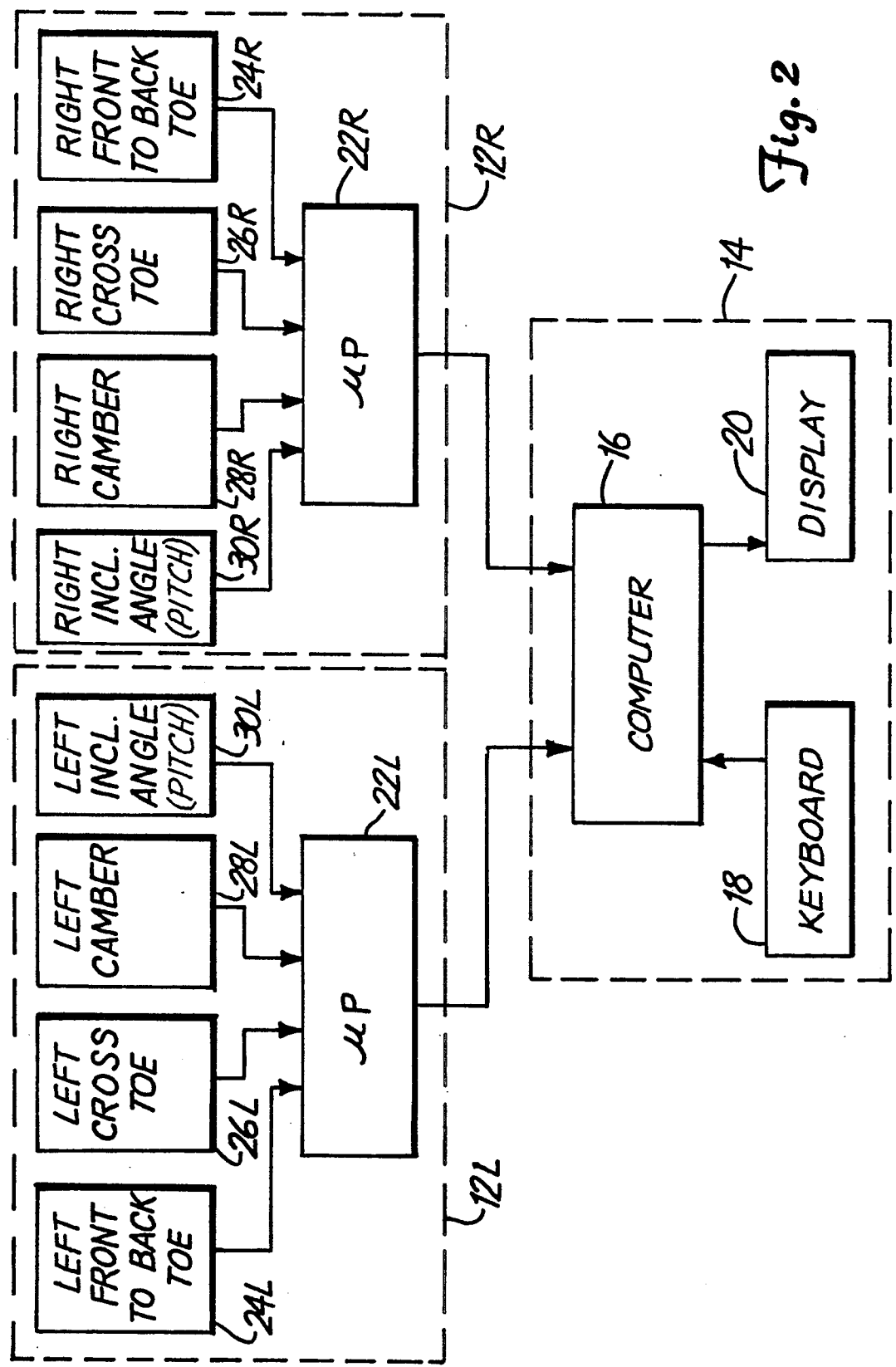
FIG. 2 is a block diagram of a wheel alignment system.

In order to provide SAI compensation for a live caster reading, and in order to provide caster compensation for a live camber reading, SAI and caster are first measured in a manner similar to that described in more detail in the Kling, et al. U.S. Pat. No. 5,014,227, which is hereby fully incorporated herein by reference. Briefly, in the Kling, et al. patent, toe, camber and inclination angle measurements are made by left and right head units 12L and 12R for wheels 10L and 10R, respectively. As shown in FIG. 2, head units 12L and 12R are connected to a main console 14, which includes computer 16, keyboard 18 and display 20. Left head unit 12L includes microprocessor 22L, left front-to-back toe sensor 24L, left cross toe sensor 26L, left camber sensor 28L and left inclination angle sensor 30L. Similarly, right head unit 12R includes microprocessor 22R, right front-to-back toe sensor 24R, right cross toe sensor 26R, right camber sensor 28R and right inclination angle sensor 30R. Rear wheels 11L and 11R include similar head units (not shown) for measuring the thrust line of the vehicle.

Computer 16 receives commands and input data from keyboard 18 and provides information and instructions to automotive service technicians through display 20. Computer 16 also receives measurement data from microprocessors 22L and 22R of head units 12L and 12R, respectively. Microprocessors 22L and 22R receive sensor signals from their associated sensors and process those signals as needed before sending the signals to computer 16 for further analysis.

Caster and SAI for each wheel are calculated by computer 16 based on the change in the two camber inclination angle readings for the wheel being measured at the left and right turn positions shown in FIGS. 1A and 1B. In one embodiment, wheels 10L and 10R are first turned to a left toe-out position by an angle X (e.g., 7 degrees). Then, the wheels 10L and 10R are turned to a right toe-out position, shown in FIG. 1B by an angle X (e.g., 7 degrees). At each position, measurements are taken from head units 12L and 12R. Using the two sets of measured values produced at the left and right toe-out positions, the caster and SAI are calculated by computer 16 using an iterative technique or through direct solution of equations.

B. Caster, Camber and SAI

Camber is the inward or outward tilt of a wheel defined from a true vertical line when the wheel is at zero toe.

Live_camber is a measurement of the camber angle by an inclinometer sensor which is continuously updated to reflect changes in camber due to adjustments.

Pitch is the rotation of a sensor in the plane of the wheel.

Live_pitch is a measurement of the pitch angle by an inclinometer sensor which is continuously updated to reflect changes in caster due to adjustments.

A live caster meter reading is needed to enable adjustment of the caster of the wheel being measured to bring the wheel into proper alignment. In order to obtain a live caster meter reading, wheels 10L and 10R, according to prior art methods, would need to be turned to a "toe zero" position plus or minus a very small tolerance. The reason that the wheel being measured needed to be brought to a toe zero position is that the SAI built into all vehicles causes the live pitch reading of the wheel being measured to change if the toe is not kept at or near zero degrees. This effect is due to simple steering geometry and is described in detail in Section "C."

FIG. 3 is a drawing which illustrates the steering axis inclination (SAI). FIG. 3 shows a wheel, for example wheel 10L, and a strut 32. SAI is defined as the angle between axis 34, which is a true plumb line, and a projected line 36 through the center of strut 32 when wheel 10L is at zero degrees camber.

FIG. 4 is a drawing which illustrates caster. FIG. 4 includes steerable wheel 10L, as well as axis 34 which represents a true plumb line. Caster is an angle determined by a backward or forward tilt of a steering knuckle or spindle support with respect to axis 34 when the wheel is turned through an arc. FIG. 4 shows a wheel having a positive caster (i.e., the angle is defined as a backward tilt of the steering knuckle from the true plumb line 34).

FIGS. 5A–5C are drawings which illustrate camber FIGS. 5A–5C include a steerable wheel 10L, as well as axis 34 which represents a true plumb line. Camber is measured starting from the true plumb line 34 in degrees or fractions of a degree. This is illustrated in FIG. 5A. FIG. 5B shows a steerable wheel 10L having positive caster (i.e., the wheel is tilted outward at the top relative to true plumb line 34). FIG. 5C shows a wheel 10L having negative camber (i.e., the wheel is tilted inward at the top with respect to true plumb line 34).

C. Compensation For The Effects Of SAI On Live Caster

Figure 6B:
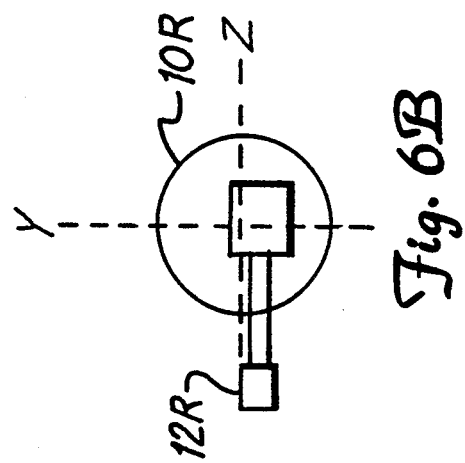
FIGS. 6A–6D are drawings illustrating the effect of SAI on caster adjustment meters.
Figure 6D:
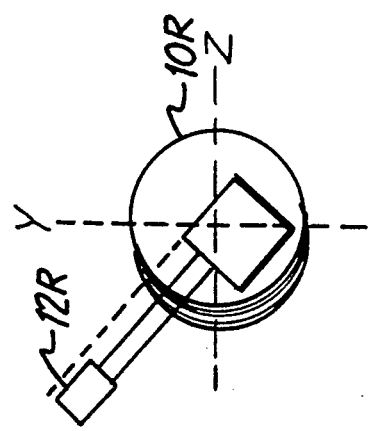
Figure 6A:
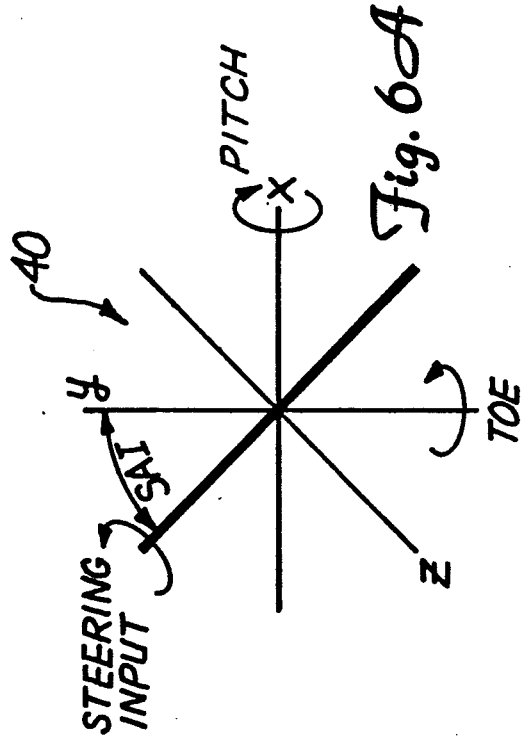

FIGS. 6A–6D show the effects of SAI on a live caster reading taken from a caster adjustment meter. FIG. 6A shows a three dimensional scale having x,y and z axes. If a steerable wheel, such as right front wheel 10R, were centered at the center of scale 40, with the z axis running through the center of a corresponding left front wheel 10L, and with the x axis running through a corresponding right rear wheel 11R, the degree of rotation of the wheel 10R with respect to the x axis would define the pitch of wheel 10R. The degree of rotation of the wheel 10R with respect to the y axis would define the toe angle of the wheel. Given the SAI shown in FIG. 6A, any steering input to wheel 10R would cause a rotation in the toe and pitch planes.

Figure 6C:
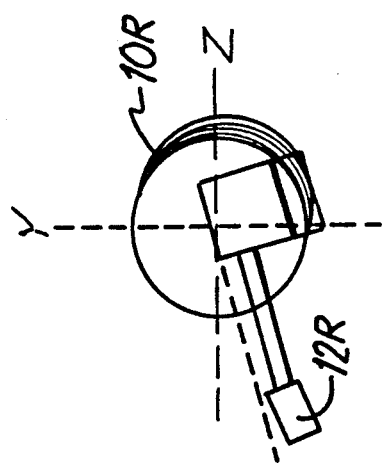

FIG. 6B shows wheel 10R at zero toe. FIG. 6B shows that, when wheel 10R is at a zero toe position, head unit 12R is substantially level. FIG. 6C, however, shows that when wheel 10R is in a toe-in position, due to the SAI angle, wheel 10R rotates in the toe and pitch planes thereby tilting head unit 12R downward. FIG. 6D shows that when wheel 10R is in a toe-out position, the SAI angle causes rotation in the toe and pitch planes thereby causing head unit 12R to tip upwards. Because of these effects of SAI on pitch, current alignment systems require the toe angle of the wheel being measured to be at or very near zero for live caster readings.

However, it has been found that the relationship between SAI, caster, and toe is defined by the following equations:

$$\Delta toe = \cos(SAI) * \text{steering input angle} \quad \text{Eq. 2}$$

$$\Delta pitch = \sin(SAI) * \text{steering input angle} \quad \text{Eq. 3}$$

Changes in pitch and changes in toe can be measured. Also, the SAI can be calculated using the caster swing procedure described in greater detail in the Kling, et al. U.S. Pat. No. 5,015,227. The steering input angle is unknown and can be eliminated by combining equations 2 and 3 as follows:

$$\Delta pitch = \tan(SAI) * \Delta toe \quad \text{Eq. 4}$$

Thus, equation 4 provides a mechanism to calculate the pitch change caused by SAI at any given toe angle (i.e., Eq. 4 provides an SAI compensation term). However, in order to arrive at a final compensation term for the effect of SAI on caster, the camber angle must also be considered. Therefore, equation 4 can be modified to give the final SAI compensation term as follows:

$$\Delta pitch = \tan(SAI + \text{live camber}) * \Delta toe \quad \text{Eq. 5}$$

By adding the SAI compensation term into the previous formula for live caster readings (Eq. 1), a new formula is derived:

live caster = live pitch + tan (SAI + live camber) * Δtoe − pitch at zero toe + calculated caster  Eq. 6

The new live caster equation includes the SAI compensation term so that live caster can be accurately measured and displayed using the live caster meter when the wheel being measured is in a non-zero toe position.

Thus, by using the compensation technique, there are several advantages derived. The caster swing procedure can be abbreviated. There is no need to obtain pitch at the end of the caster swing when the wheel is in the zero toe position. Pitch at zero toe can be calculated directly using equation 5. Equation 5 can be manipulated to yield the following formula for pitch_at_zero_toe:

$$\text{pitch\_at\_zero\_toe} = \text{pitch\_at\_zero\_steering\_angle} + \text{toe\_at\_zero\_steering\_angle} * \tan(SAI + \text{Camber}) \quad \text{Eq. 7}$$

Also, the toe reading for both wheels need only be taken at one position. This eliminates a complete step from the previous caster swing procedure which required each steerable wheel to be positioned individually. Further, since the live caster readings are accurate regardless of whether the wheel is in the zero toe position, the operator can make caster adjustments to the wheel even in a non-zero toe position. Thus, adjustments can be made far more quickly.

FIG. 7 is a flow diagram showing the new caster swing procedure and technique for measuring caster of the present invention. FIG. 7 includes both computer and operator steps. First, the steerable wheels are turned to a first turn position, in this embodiment, a left toe-out position. This is illustrated by block 40. Readings are then taken from the measurement devices 12L and 12R as indicated by block 42. Next, the wheels 10L and 10R are steered to a second turn position, a right toe-out position. Readings are then taken from the measurement devices 12L and 12R in the right toe-out position. This is indicated by blocks 44 and 46. From these two sets of readings, SAI and caster can be calculated using the techniques illustrated in the Kling, et al. patent.

Then, rather than returning the wheels to a very accurate zero-toe position to determine pitch, the pitch at zero toe for the wheel being measured can be calculated using equation 5. This is illustrated by block 48. The caster calculated in block 48 is then compensated using the SAI compensation term determined in equation 5 so that the live caster meter reading is accurate even though the wheel may not be in a zero toe position. This is indicated in block 50. Outputs are then provided which are representative of the live caster determined in block 50. This is indicated by block 52. Based on the live caster readings, the operator can make caster adjustments to the wheel being measured.

Although the pitch at zero toe, and hence the live caster, can be theoretically calculated at any toe angle, another step may be optionally added to the caster swing procedure. In some instances, the steerable wheels may not identically track theoretical values. Therefore, if the wheels are at a rather severe toe angle (e.g., 7 degrees) the compensation term derived theoretically from equation 5 may not exactly match the actual compensation term desired. Therefore, the operator may wish to add one further step to the caster swing procedure. After the wheels are turned to the right toe-out position and after readings are taken from the measurement devices in the right toe-out position, the operator may wish to move the wheels to a very rough zero toe position. This is indicated by block 47.

The reason for this extra step is that, while the wheel being measured need not be at a precise zero-toe position, if it is reasonably close (e.g., plus or minus 0.5 degrees) the compensation term derived from equation 5 will be highly accurate. Also, since the window for the rough zero toe position is much larger than the previous 0.04 degrees, this added step can be performed quickly.

D. Compensating Live Camber For The Effects of Caster

Figure 8A:
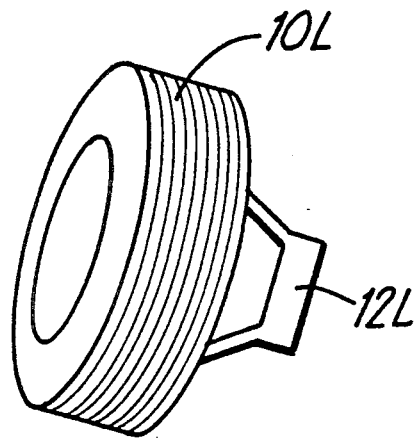
FIGS. 8A–8B are drawings illustrating the effect of caster on camber adjustment meters.
Figure 8B:
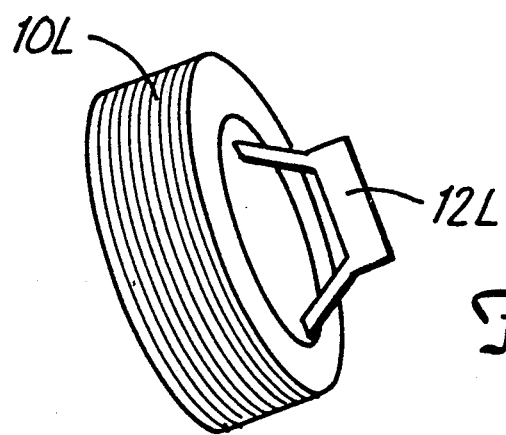

Caster affects camber readings in substantially the same manner as SAI affects pitch readings. FIG. 8A shows a steerable wheel, such as wheel 10L with a measurement device 12L attached. FIG. 8A shows that, because of caster, when wheel 10L is in a toe-out position, positive camber results on cars with positive caster. FIG. 6B shows that, when wheel 10L is in a toe-in position, the wheel has negative camber on cars with positive caster. The geometrical relationship between caster, camber and toe is as follows:

$$\Delta toe = \cos(\text{caster}) * \text{steering input angle} \qquad \text{Eq. 8}$$

$$\Delta camber = \sin(\text{caster}) * \text{steering input angle} \qquad \text{Eq. 9}$$

On most vehicles, the caster angle is much less than the SAI angle. Therefore, the effects of caster on camber are much less noticeable if the toe for the wheel being measured is in a non-zero position. However, to increase the accuracy of camber readings, it is desirable to compensate for the effects of caster.

Since, as with the SAI compensation, the steering input angle in the above two equations is unknown, it can be eliminated by combining the equations. That combination yields the following equation which is representative of the change in camber due to caster (i.e., it is representative of the caster compensation term for compensating camber).

$$\Delta camber = \tan(\text{caster}) * \Delta toe \qquad \text{Eq. 10}$$

This compensation term can be added into the live camber reading to compensate for errors in camber due to caster. Thus, where live camber' is the uncompensated camber reading, the addition of the compensation term yields the following reading for live camber:

$$\text{live camber} = \text{live1 camber}' + \tan(\text{caster}) * \Delta toe \qquad \text{Eq. 11}$$

FIG. 9 is a flow diagram which illustrates the technique for measuring camber and for compensating live camber readings for changes due to caster. FIG. 9 includes both computer and operator steps. Once the live caster is determined, the caster compensation term can be determined as indicated in block 56. Then, the live camber reading is compensated based on the caster and the caster compensation term, and outputs are provided representative of the live camber reading. These steps are indicated by blocks 58 and 60. The operator can then make camber adjustments based on the outputs.

CONCLUSION

The alignment system of the present invention provides a technique whereby live adjustment meters can compensate caster and camber angles for not being at zero toe and for the effects of SAI on caster and for the effects of caster on camber. An SAI compensation term is determined and used to compensate the caster angle. A caster compensation term is determined and used to compensate the camber angle. Further, the pitch at zero-toe can be calculated and need not be directly measured. Thus, this technique allows an operator to adjust caster and camber for a wheel at any toe angle. Also, the compensation ensures quicker, easier and more accurate alignment adjustments since there is no need to adjust the wheels so that they are at a zero toe position.

Although the present invention has been described with reference to preferred embodiments, workers skilled in the art will recognize that changes may be made in form and detail without departing from the spirit and scope of the invention.

What is claimed is:

1. A method of measuring live caster of left and right steerable wheels of a vehicle, the method comprising:
    mounting measurement devices on the left and right steerable wheels;
    calculating caster for each of the wheels based on measurements made with the measurement devices;
    calculating steering axis inclination (SAI) for the left and right wheels based on measurements made with the measurement devices;
    determining pitch at zero toe for the left and right wheels;
    determining an SAI compensation term to compensate the live caster of each wheel for changes in live pitch due to the SAI when the toe is in a non-zero position; and
    calculating live caster of each wheel using the live pitch of the wheel, the caster calculated for the wheel, the pitch at zero toe for the wheel, and the SAI compensation term for the wheel.

2. The method of claim 1 wherein the SAI compensation term is an amount (delta pitch) by which the pitch of the wheel being measured is changed due to SAI, and wherein the step of determining an SAI compensation term comprises:
    determining live camber for the wheel being measured;
    determining an amount (delta toe) by which the wheel being measured is in a non-zero position; and
    calculating delta pitch according to the equation:
    delta pitch = tan(SAI + live camber) * delta toe.

3. The method of claim 2 wherein the step of determining live caster comprises:
    determining live pitch for the wheel being measured;
    calculating live caster according to the equation: live caster = live pitch + delta pitch − pitch at zero toe + calculated caster.

4. The method of claim 3 wherein the step of determining pitch at zero toe comprises:
    calculating pitch at zero toe according to the equation: pitch_at_zero_toe = pitch_at_zero_steering_angle + toe_at_zero_steering_angle * tan (SAI + Camber).

5. A method of measuring live camber for left and right steerable wheels of a vehicle, the method comprising:
    mounting measurement devices on the left and right steerable wheels;
    determining a caster compensation term for the left and right steerable wheels based on measurements from the measurement devices;
    measuring camber for the left and right steerable wheels using the measurement, devices; and
    calculating live camber for the left and right steerable wheels based on the caster compensation term determined and the measured camber.

6. The method of claim 5 wherein the step of determining a caster compensation term comprises:

determining a change in live camber (delta camber) caused by caster when the steerable wheels are at a non-zero toe position.

7. The method of claim 6 wherein the step of determining a change in live camber comprises:

determining caster for the steerable wheels;

determining an amount (delta toe) that the toe of the steerable wheel being measured is from a zero toe position; and calculating delta camber according to the following equation:

delta camber = tan(caster) * delta toe.

8. The method of claim 7 wherein the step of calculating live camber comprises:

determining an uncompensated live camber (live camber') for the steerable wheel being measured; and calculating live camber according to the equation: live camber = live camber' + delta camber.

9. A method performing a caster swing operation to determine live caster for left and right steerable wheels, the method comprising:

mounting measurement devices to the left and right steerable wheels;

turning the wheels to a first turn position in which one of the left or right wheels is toed-out;

making toe, camber and inclination measurements using the measurement devices while the wheels are in the first position;

turning the wheels to a second turn position in which the other of the left or right wheels is toed-out;

making toe, camber and inclination measurements using the measurement devices while the wheels are in the second position;

calculating pitch at zero toe for one of the wheels;

determining live caster based on the toe, camber and inclination measurements taken while the wheels were in the first and second turn positions and based on the calculated pitch at zero toe.

10. The method of claim 9 wherein the step of calculating pitch at zero toe comprises:

calculating pitch at zero toe according to the equation: delta pitch = tan(SAI + live camber) * delta toe; and wherein SAI is steering axis inclination of the steerable wheel being measured, delta pitch is a change in pitch of the steerable wheel being measured and delta toe is a change in toe for the steerable wheel being measured.

* * * * *